T. C. DEXTER.
FLEXIBLE COUPLING.
APPLICATION FILED MAY 25, 1915.
1,189,925.
Patented July 4, 1916.
2 SHEETS—SHEET 1.
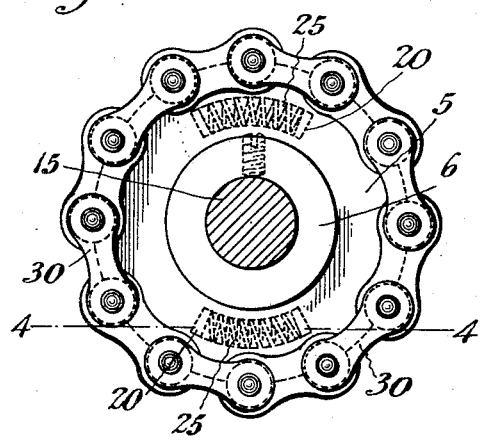
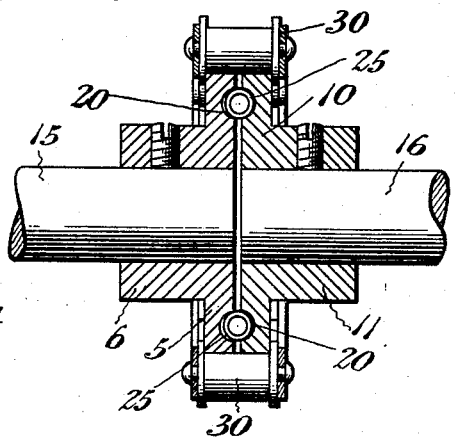
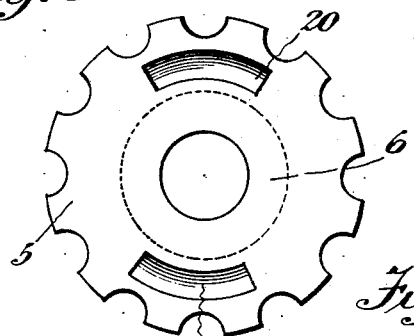
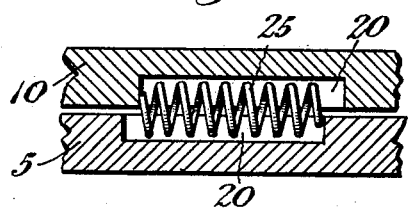
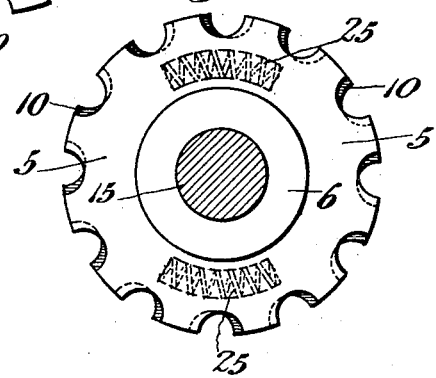
Talbot C. Dexter Inventor
By his Attorneys

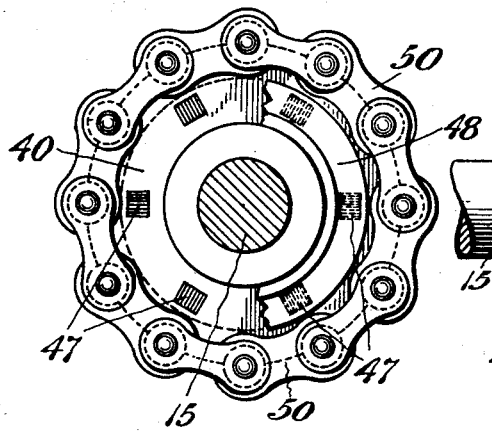
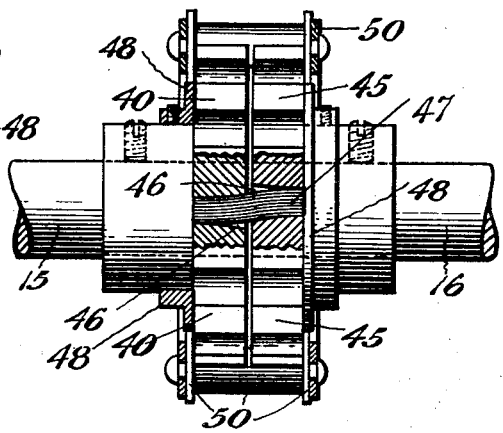
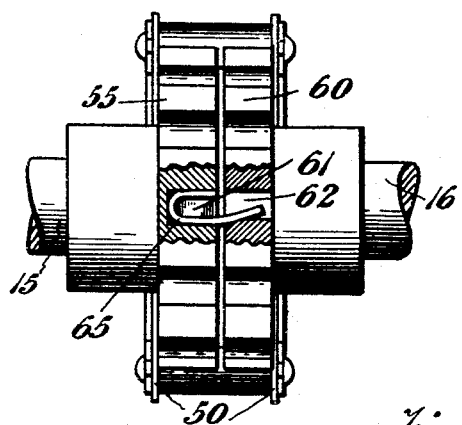
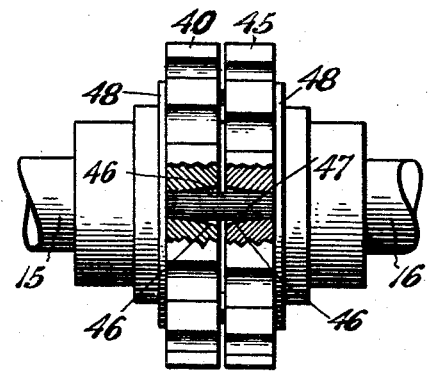
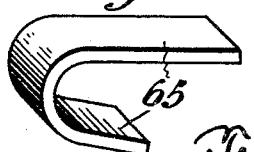

UNITED STATES PATENT OFFICE.

TALBOT C. DEXTER, OF PEARL RIVER, NEW YORK, ASSIGNOR TO I. H. DEXTER COMPANY, INC., OF NEW YORK, N. Y., A CORPORATION OF NEW YORK.

FLEXIBLE COUPLING.

1,189,925.   Specification of Letters Patent.   Patented July 4, 1916.

Application filed May 25, 1915. Serial No. 30,318.

*To all whom it may concern:*

Be it known that I, TALBOT C. DEXTER, a citizen of the United States, and residing at Pearl River, in the county of Rockland and State of New York, have invented certain new and useful Improvements in Flexible Couplings, of which the following is a full and clear specification.

The present invention relates to improvements in the type of flexible couplings comprising a pair of spaced sprocket members secured respectively to the driving and driven shaft sections and links or other coupling devices engaging the sprockets of the respective members for flexibly connecting the members to compensate for inaccuracies in alinement between the driving and driven shaft sections. The coupling devices are preferably in the form of an endless sprocket chain embracing and flexibly uniting the sprocket members. In the practical operation of this type of flexible coupling it has been found that, after the coupling has been in use and has become slightly worn, the backlash or free-play between the sprocket members and the coupling chain is productive of undue noise and wear, particularly when the coupling is employed in a machine driven by a reciprocating motor.

The present invention is designed primarily to avoid the objectionable pounding and resulting wear in this type of flexible coupling.

In accomplishing the desired object I have produced a flexible coupling of the type referred to in which the relative circumferential movement between the sprocket members is cushioned by a spring device so arranged that the sprocket members will be yieldingly held in their operative relation in engagement with the driving coupling chain.

In order that my invention may be fully understood I will first describe the same with reference to the accompanying drawings and afterward point out the novelty more particularly in the annexed claims.

In said drawings, Figure 1 is a side elevation of a flexible coupling embodying my invention; Fig. 2 is a longitudinal sectional view of the same; Fig. 3 is an inside elevation of one of the sprocket members of the coupling; Fig. 4 is an enlarged detail sectional view illustrating one of the spring devices; Fig. 5 is a side elevation similar to Fig. 1 with the coupling chain removed; Fig. 6 is a view similar to Fig. 1 illustrating a modified form of spring device; Fig. 7 is a side elevation of the same having parts broken away to show the interior arrangement of the spring device; Fig. 8 is a similar view of the same with the coupling chain removed; Fig. 9 is a view similar to Fig. 7 showing a further modified form of spring device; Fig. 10 is a detailed perspective view of the form of spring shown in Fig. 9.

In illustrating my present invention I have adopted the specific form of flexible couplings covered by the patent of Charles H. Clark, No. 1147373, dated July 20th, 1915, but I would have it understood that this form of coupling has been adopted only for the purpose of illustration and that I do not limit myself to the peculiarities of this Clark flexible coupling.

In the form of coupling shown in Figs. 1 to 5 of the accompanying drawings, I employ two sprocket members 5 and 10 formed respectively with integral hubs 6 and 11, by which the sprocket members may be rigidly secured upon line shaft sections 15, 16 to present the sprocket members 5, 10 in approximately parallel relation. In the inner face of each sprocket member is formed one or more curved cavities 20 approximately semi-circular in cross section. The cavities 20 of one sprocket member are arranged to register with the cavities 20 of the other sprocket member, when the sprocket members 5 and 10 are presented face to face, to thereby form recesses for the reception of spiral springs 25 which are under compression and approximately fill said recesses and tend to hold the sprocket members in position with their cavities 20 in registry. The relative location of cavities 20 in the respective sprocket members 5 and 10 is such that the sprocket teeth of members 5 and 10 will be staggered or out of radial alinement when the cavities are in registry, as illustrated in Fig. 5 of the drawings. 30 is an endless sprocket chain embracing the paired sprocket members 5 and 10 and flexibly coupling them together. Each link of chain 30 embraces a pair of sprocket teeth, one on each of members 5 and 10. When the chain is mounted upon the sprocket members 5 and 10, it is necessary to move said members relatively in a circumferential direction to aline the sprocket teeth to receive the chain links, and in doing this the springs 25 confined in cavities 20 are compressed slightly by the resulting off-set given to cavities 20 as shown in Figs. 1 and 4. The encircling chain is fastened in the usual manner. The confined springs 25 tend to separate the coupled pairs of sprocket teeth, thereby yieldingly holding the teeth of the respective members 5 and 10 in engagement with the opposite ends of the chain links and absorbing all backlash between said coupled members.

In Figs. 6, 7 and 8 of the drawings I have shown a modidfied form of my invention in which I have embodied spring devices of the form illustrated in Patent 524,087 of August 7, 1894. In this form of the coupling the sprocket members 40, 45 have formed in them axial slots 46 slightly enlarged at their inner ends and mounted in these slots are groups of plate or leaf springs 47 held against longitudinal displacement by rings 48 secured to the hubs of sprocket members 40 and 45. Fig. 8 shows this modified arrangement with the sprocket chain removed, in which position of the parts the groups of springs 47 are in normal straight position, holding the sprocket teeth of the respective members 40 and 45 slightly out of radial alinement. When the sprocket chain 50 or other coupling devices are mounted upon the sprocket members 40 and 45, it is necessary to relatively move said members slightly in circumferential direction to aline the sprocket teeth for the reception of the links of the coupling's sprocket chain. This operation places the cushion springs 47 under strain, as shown in Fig. 7 of the drawings, the springs in this position tending to throw the sprocket teeth out of alinement by relatively moving them circumferentially, which movement is resisted by the coupling sprocket chain. In this way the cushion springs 47 yieldingly hold the coupled sprocket teeth in engagement with opposite ends of the embracing sprocket links.

In Fig. 9, I have shown a further slight modification in which the sprocket members 55 and 60 are respectively formed with slots or recesses 61, 62 for the reception of cushioning springs 65 which are retained in the recesses 61 and engage the walls of recesses 62. The spring devices in this form of the coupling act substantially in the same manner as those shown in Figs. 6, 7 and 8.

It will be observed that in all of the several forms of my improved flexible coupling, the sprocket teeth of the driving and driven sprocket members are yieldingly held in engagement with opposite ends of the coupling links whereby all backlash is taken up or cushioned. The importance of this construction lies in the fact that when the parts of the coupling become slightly worn, the cushioning spring devices acting oppositely upon the coupling members, hold the sprocket teeth in operative engagement with the coupling chain, so that there is no objectionable knocking between the parts. The improved form of coupling will be less subject to wear and will run more quietly than the flexible couplings of this type heretofore used. The utility of the improvement is particularly valuable for couplings employed in machines driven by reciprocating or intermittent engines or motors.

I claim:

1. A flexible coupling comprising relatively movable power transmitting members, adapted to be mounted respectively upon driving and driven shafts, a non-yielding coupling element between said members, and a spring device interposed between said members and yieldingly holding the driven one of said members in engagement with said coupling element.

2. A flexible coupling comprising approximately alined driving and driven shafts, relatively movable power transmitting members mounted respectively upon said shafts, a positive driving coupling element between said members and a circumferentially acting spring device interposed between said members.

3. In a device of the character set forth, the combination with the power transmitting driving and driven sprocket members, adapted to be mounted respectively upon driving and driven shafts, and coupling links engaging the sprockets of said members, of a spring device interposed between said sprocket members and tending to separate said coupled sprockets to hold them in engagement with opposite portions of the coupling links.

4. In a device of the character set forth, the combination with the power transmitting driving and driven sprocket members adapted to be mounted respectively upon driving and driven shafts, and an endless sprocket chain encircling and flexibly coupling said members, the links of said chain embracing adjacent sprockets of said members, of a spring device interposed between said sprocket members and tending to separate said coupling sprockets to hold them in opposite ends of said links.

TALBOT C. DEXTER.